(12) United States Patent
Chou

(10) Patent No.: US 6,380,498 B1
(45) Date of Patent: Apr. 30, 2002

(54) POSITION CONTROL DEVICE

(75) Inventor: Chin-Wen Chou, Taipei Hsien (TW)

(73) Assignee: Shin Jiuh Corp., Taipei Hsien (TW)

( * ) Notice: Subject to any disclaimer, the term of this patent is extended or adjusted under 35 U.S.C. 154(b) by 0 days.

(21) Appl. No.: 09/364,198

(22) Filed: Jul. 30, 1999

(51) Int. Cl.[7] ............... H01H 19/00; H01H 21/00; H01H 25/04
(52) U.S. Cl. ............. 200/6; 200/6 R; 200/17 R; 200/18
(58) Field of Search ................. 200/5 R, 6 R, 200/6 A, 17 R, 18, 335; 345/163, 161, 157, 159; 43/37, 38; 700/85

(56) References Cited

U.S. PATENT DOCUMENTS

| | | | | |
|---|---|---|---|---|
| 4,739,128 A | * | 4/1988 | Grisham | 200/6 A |
| 4,769,517 A | * | 9/1988 | Swinney | 200/6 A |
| 5,790,102 A | * | 8/1998 | Nassimi | 345/163 |
| 5,949,325 A | * | 9/1999 | Devolpi | 338/154 |

* cited by examiner

Primary Examiner—Michael Friedhofer
Assistant Examiner—Kyung S. Lee
(74) Attorney, Agent, or Firm—Bacon & Thomas, PLLC

(57) ABSTRACT

A position control device includes a base board, a conductive spring contact unit and a control key. The base board has one side provided with a conductive contact set that includes a plurality of angularly spaced conductive contacts. The conductive spring contact unit is secured to the base board, and includes a plurality of angularly spaced spring contact arms that extend in radial directions and in a direction away from the base board such that each of the spring contact arms overlies spacedly a corresponding one of the conductive contacts of the conductive contact set. The control key is disposed on the conductive spring contact unit such that application of a force on the control key in a direction toward the base board will result in movement of an appropriate one of the spring contact arms for establishing electrical connection with the corresponding one of the conductive contacts.

19 Claims, 6 Drawing Sheets

POSITION CONTROL DEVICE

BACKGROUND OF THE INVENTION

1. Field of the Invention

The invention relates to a position control device, more particularly to one suitable for controlling movement of a pointer or cursor.

2. Description of the Related Art

Many types of cursor control devices, such as joysticks, computer mice and digitizing boards, are available in the market. Since conventional joysticks employ at least four microswitches to detect the desired direction of movement, it difficult to further reduce the size of the joystick for application on a computer keyboard.

SUMMARY OF THE INVENTION

The main object of the present invention is to provide a position control device having a simple construction and a relatively small size.

According to the present invention, a position control device comprises a base board, a conductive spring contact unit and a control key. The base board has one side provided with a conductive contact set that includes a plurality of angularly spaced conductive contacts. The conductive spring contact unit is secured to the base board, and includes a plurality of angularly spaced spring contact arms that extend in radial directions and in a direction away from the base board such that each of the spring contact arms overlies spacedly a corresponding one of the conductive contacts of the conductive contact set. The control key is disposed on the conductive spring contact unit such that application of a force on the control key in a direction toward the base board will result in movement of an appropriate one of the spring contact arms for establishing electrical connection with the corresponding one of the conductive contacts.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
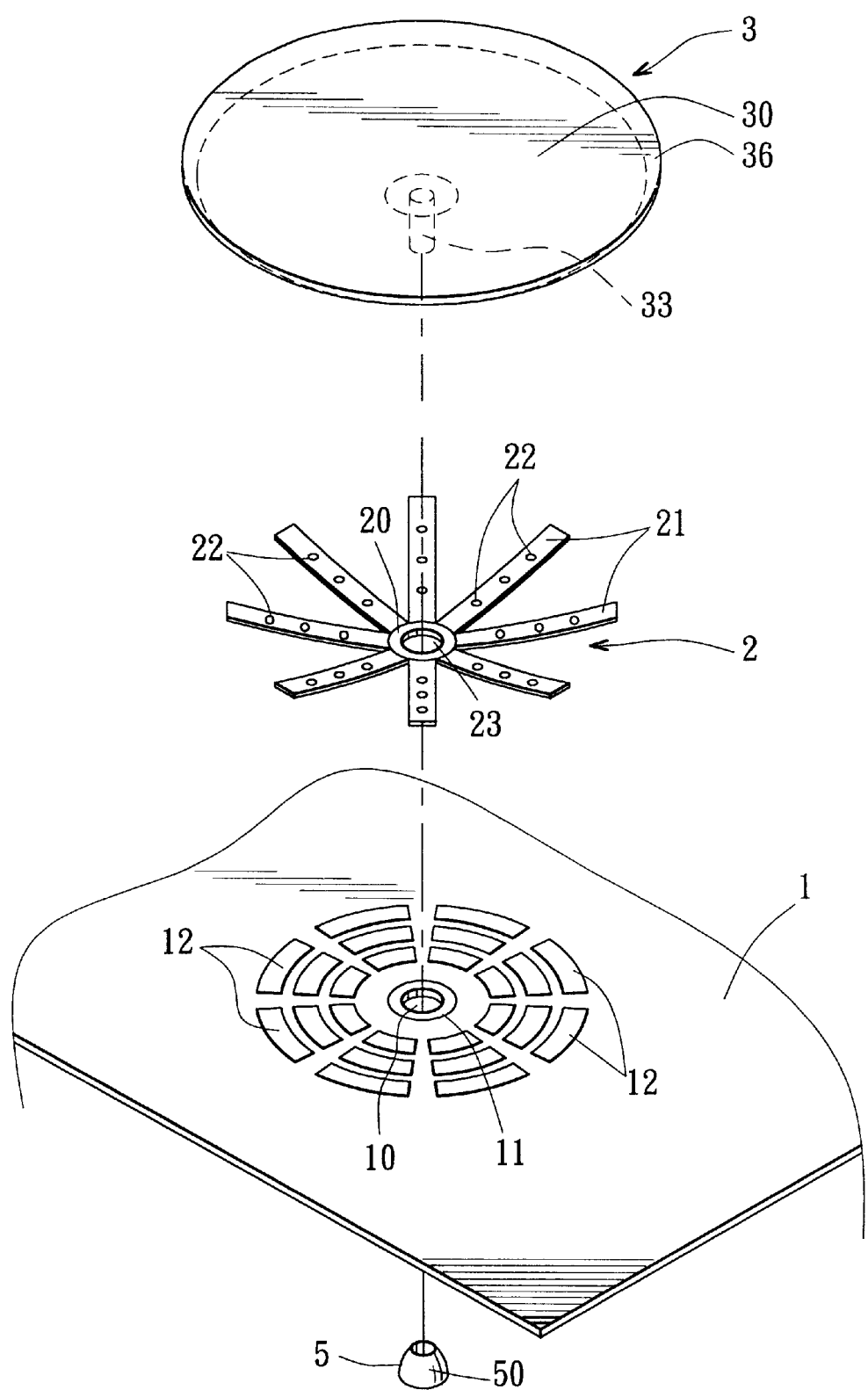
FIG. 1 is an exploded view illustrating the first preferred embodiment of a position control device according to the present invention.

Before the present invention is described in greater detail, it should be noted that like elements are denoted by the same reference numerals throughout the disclosure.

Figure 2:
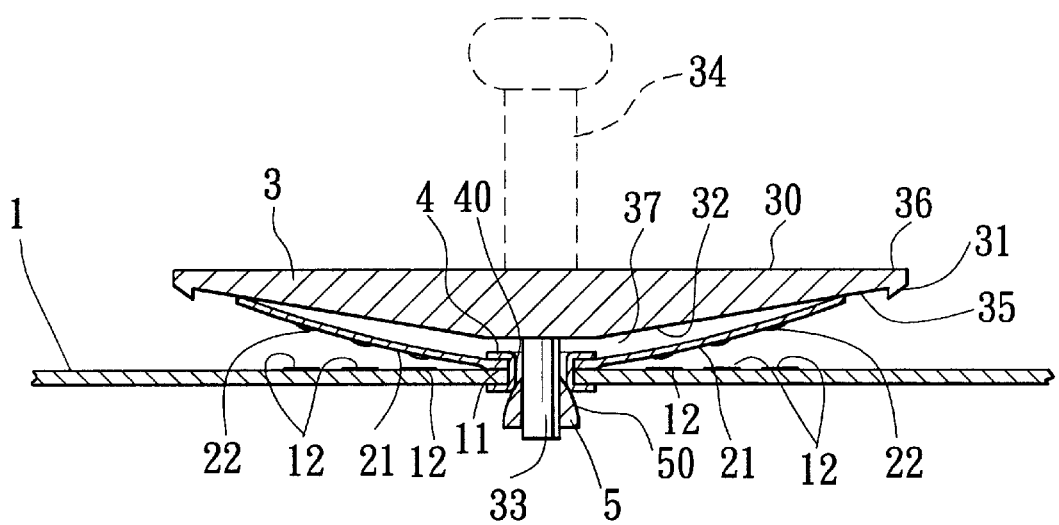
FIG. 2 is a sectional view showing the first preferred embodiment in a non-operated state.
Figure 3:
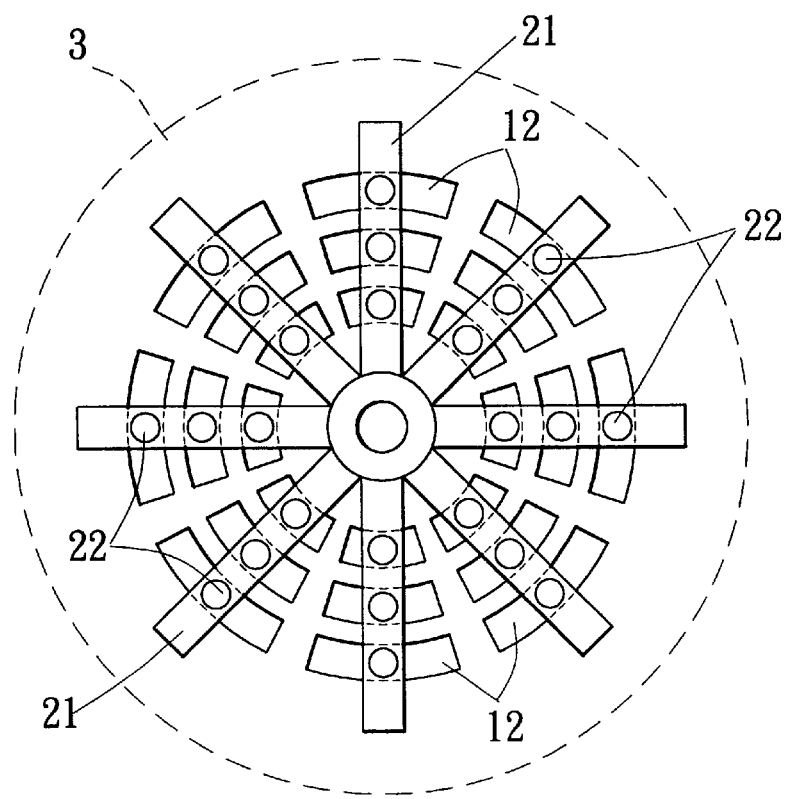
FIG. 3 is a schematic top view of the first preferred embodiment, with a control key thereof illustrated in phantom lines.
Figure 4:
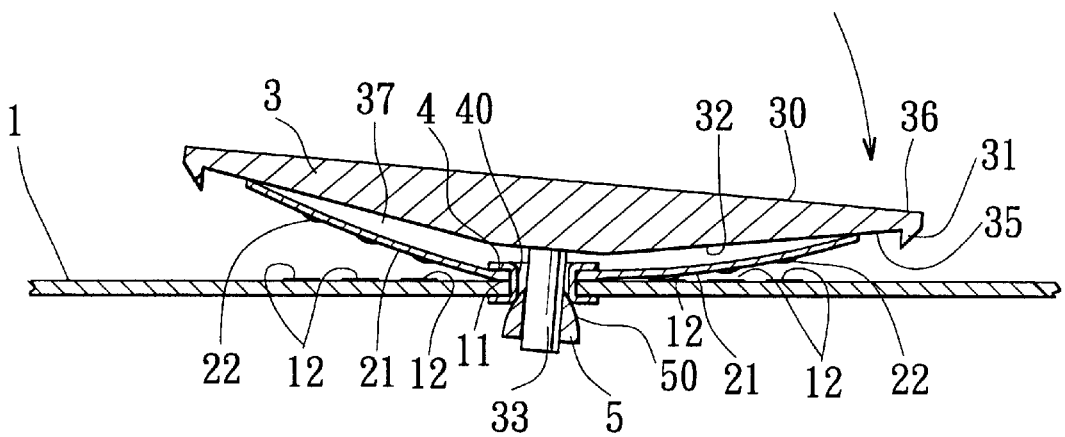
FIG. 4 is a sectional view showing the first preferred embodiment in a first operative position.

Referring to FIGS. 1 to 3, the first preferred embodiment of a position control device according to the present invention is shown to comprise a base board 1, a conductive spring contact unit 2, and a control key 3.

The base board 1, such as a printed circuit board or a thin film circuit board, is formed with a first through hole 10. A conductive ring member 11 is mounted in a periphery of the base board 1 that confines the first through hole 10. In this embodiment, three conductive contact sets are provided on a top side of the base board 1, each of which includes eight angularly spaced conductive contacts 12 disposed at different angular positions with respect to the first through hole 10. The conductive contact sets are located at different radial distances with respect to the first through hole 10. The conductive ring member 11 and the conductive contacts 12 are connected electrically to a control circuit (not shown) via circuit traces (not shown) on the base board 1 in order to provide the conductive ring member 11 and the conductive contacts 12 with different electrical characteristics. Since the feature of the present invention is not directed to the construction of the control circuit, which can be easily achieved by the person skilled in the art, a detailed description of the same will be omitted herein for the sake of brevity.

In the preferred embodiment, the conductive spring contact unit 2 is formed integrally from a metal spring plate, and includes a central portion 20 and eight angularly spaced spring contact arms 21 that radiate from the central portion 20 and that curve upwardly in a direction away from the base board 1. The spring contact arms 21 thus cooperate to form a bowl-shaped configuration. Each of the spring contact arms 21 overlies spacedly a corresponding one of the conductive contacts 12 in each of the conductive contact sets. Each of the spring contact arms 21 is formed with three contact projections 22, each of which corresponds to said one of the conductive contacts 12 in a respective one of the conductive contact sets. The central portion 20 is formed with a second through hole 23 that is aligned with the first through hole 10. The conductive spring contact unit 2 is secured on the top side of the base board 1, with the conductive spring contact unit 2 in electrical contact with the conductive ring member 11 such that the conductive spring contact unit 2 has the same electrical characteristic as the conductive ring member 11. In this embodiment, a rivet 4 is formed with a third through hole 40 coaxial with the through holes 10, 23, and is mounted in the first and second through holes 10, 23, thereby securing the conductive spring contact unit 2 on the base board 1.

The control key 3 has a top operating side 30 and a conic bottom base side 32 such that a cross-section of the control key 3 decreases gradually in the direction toward the base board 1. The control key 3 has a peripheral portion 36 formed with a stop flange 31 that extends in the direction toward the base board 1. The control key 3 further has a mounting post 33 that extends from a central part of the base side 32 in the direction toward the base board 1. The control key 3 is disposed on the conductive spring contact unit 2 such that the mounting post 33 extends through the third through hole 40 in the rivet 4, and such that the spring contact arms 21 bear against the base side 32 of the control key 3. Since only distal ends of the spring contact arms 21 bear against the base side 32, the remaining parts of the spring contact arms 21 form spaces 37 with the base side 32. The spring contact arms 21 are initially in a slightly compressed state by virtue of the weight of the control key 3. The distal ends of the spring contact arms 21 further form clearances 35 with the stop flange 31 in the radial directions.

Due to the clearances 35, deformation of the spring contact arms 21 is possible and can be limited by the stop flange 31. The mounting post 33 has a cross-section smaller than the size of the third through hole 40 to permit pivoting movement of the mounting post 33 relative to the base board 1. A retainer 5 engages one end of the mounting post 33 that extends through the rivet 4 for retaining pivotally the control key 3 on the base board 1. In this embodiment, the retainer 5 is hemispherical in shape, and has a convex surface 50 that abuts against the rivet 4 and that extends into the third through hole 40. The convex surface 50 aids pivoting movement of the mounting post 33 and proper positioning of the control key 3. An optional operating stick 34, which is aligned with the mounting post 33, may be mounted on the operating side 30 of the control key 3 to facilitate pivoting control of the latter.

Figure 5:
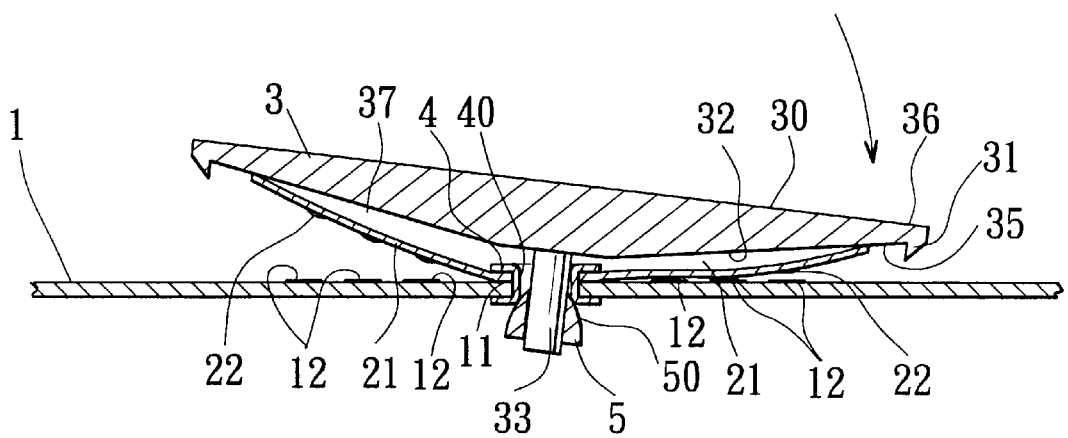
FIG. 5 is a sectional view showing the first preferred embodiment in a second operative position.

Referring to FIGS. 2 to 5, when a force is applied on the control key 3 in the direction toward the base board 1, the control key 3 will force the conductive spring contact unit 2 to elastically deform. Depending on the amount of the applied force, at least one of the contact projections 22 on the spring contact arm 21 pressed by the control key 3 will be brought into contact with the corresponding conductive contact 12 on the base board 1, thereby permitting control of cursor direction and moving speed. Particularly, when the control key 3 is pressed lightly so as to pivot relative to the base board 1 in the direction indicated by the arrow in FIG. 4, an appropriate one of the spring contact arms 21 will be moved toward the base board 1. A first contact projection 22 on the appropriate spring contact arm 21 will be brought into contact with the corresponding conductive contact 12 of the first conductive contact set closest to the conductive ring member 11, thereby establishing electrical connection between the conductive contact 12 and the conductive ring member 11. The control circuit (not shown) is thus informed of the desired direction of cursor movement. As shown in FIG. 5, when a greater amount of force is applied on the control key 3, the second and third contact projections 22 on the appropriate spring contact arm 21 will eventually be brought into contact with the corresponding conductive contacts 12 of the second and third conductive contact sets, thereby informing the control circuit (not shown) of the desire to move the cursor at faster speeds. Once the control key 3 is released, the restoring force of the spring contact arms 21 will restore the control key 3 to the initial non-operated state shown in FIG. 2.

Because the conductive spring contact unit 2 is provided with eight spring contact arms 21, position control in at least eight directions is possible in the position control device of FIGS. 1 to 5. That is to say, if two adjacent spring contact arms 21 are simultaneously pressed by the control key 3 for contacting the conductive contacts 12, the direction of movement will be in the direction between the adjacent spring contact arms 21. Thus, direction and speed control is possible in sixteen directions in the position control device of FIGS. 1 to 5. The number of spring contact arms 21 and the number of conductive contacts 12 can be varied to vary the sensitivity of the position control device.

Figure 6:
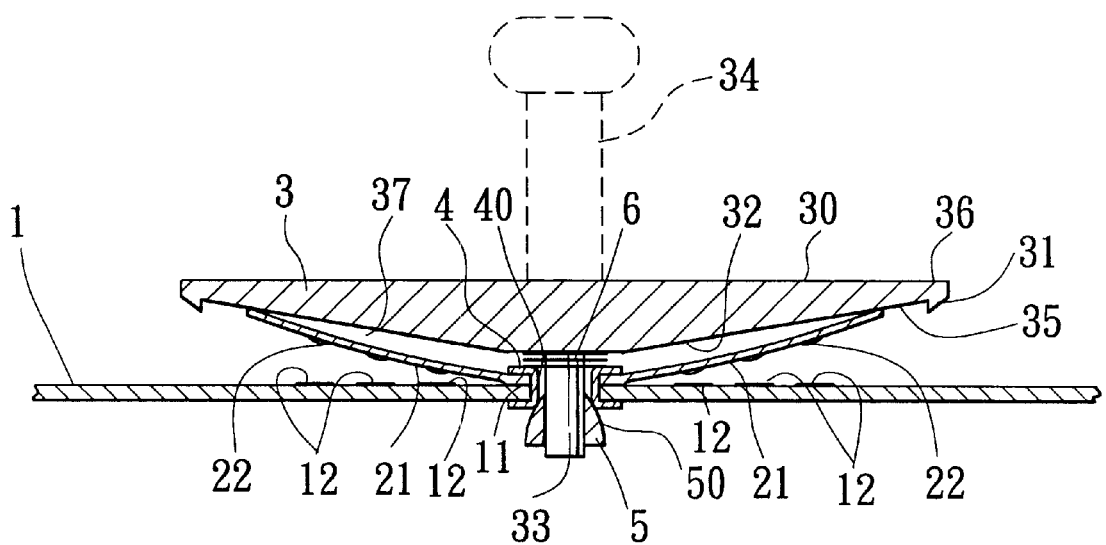
FIG. 6 is a sectional view illustrating the second preferred embodiment of a position control device according to the present invention.

FIG. 6 illustrates the second preferred embodiment of a position control device according to the present invention. Unlike the previous embodiment, a biasing member 6, in the form of a coil spring, is sleeved on the mounting post 33 and bears against the base side 32 of the control key 3 and the rivet 4, thereby biasing the control key 3 away from the base board 1. The biasing member 6 facilitates restoring of the control key 3 to the initial non-operated state.

Figure 7:
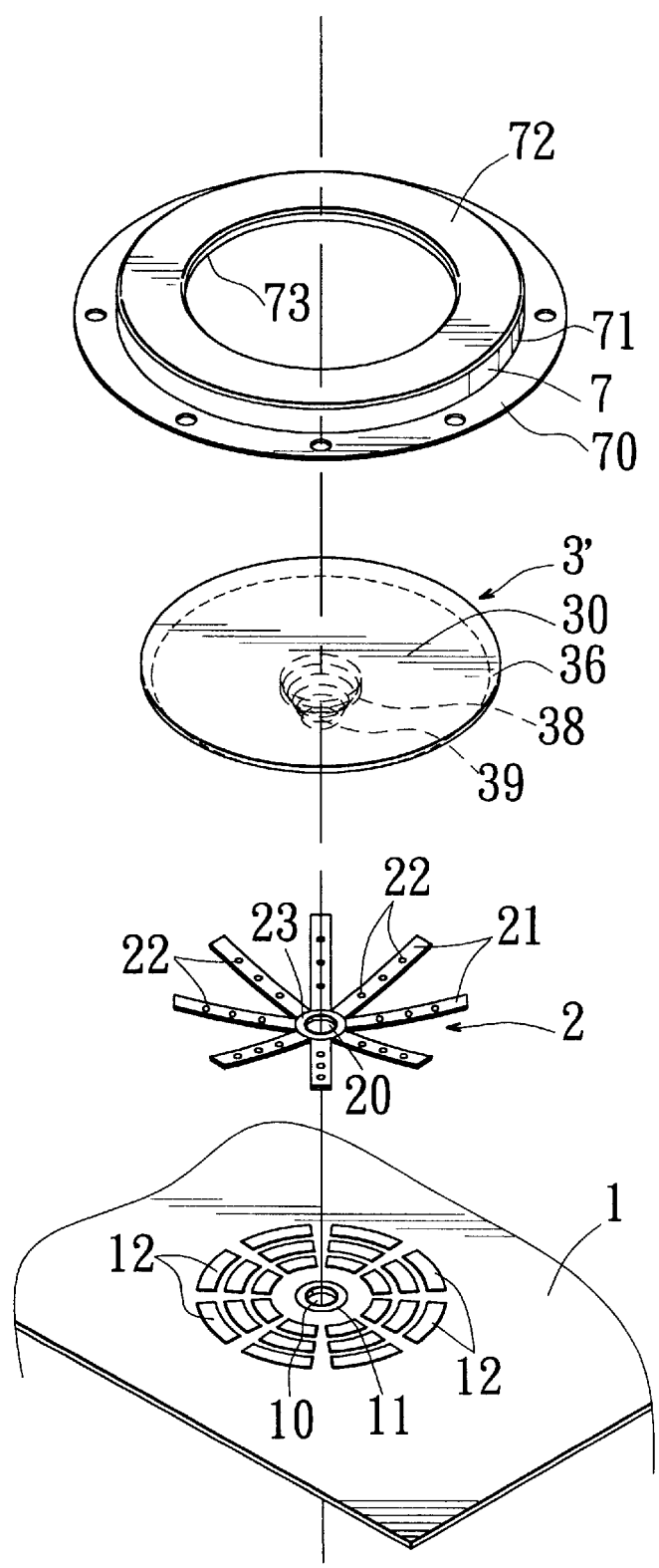
FIG. 7 is an exploded view illustrating the third preferred embodiment of a position control device according to the present invention.
Figure 8:
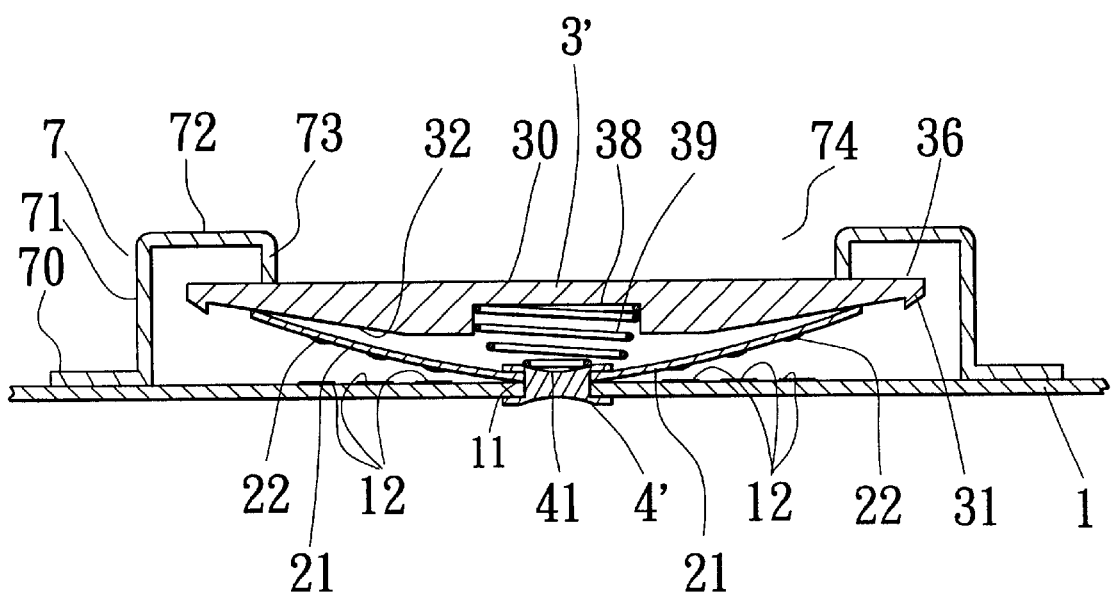
FIG. 8 is a sectional view showing the third preferred embodiment in a non-operated state.

FIGS. 7 and 8 show the third preferred embodiment of a position control device according to the present invention. Unlike the previous embodiments, no mounting post is provided for retaining the control key 3' on the base board 1. Instead of a mounting post, a hollow positioning cover 7 is in use. The positioning cover 7 includes an annular bottom flange 70 mounted on the base board 1 and surrounding the conductive contact sets, an upright outer peripheral wall 71 extending upwardly from the bottom flange 70 and beyond the operating side 30 of the control key 3' an annular upper flange 72 extending radially and inwardly from a distal end of the outer peripheral wall 71 and overlapping the peripheral portion 36 of the control key 3', and an upright inner peripheral wall 73 extending downwardly from the upper flange 72 for restricting the movement of the control key 3' in the direction away from the base board 1. The inner peripheral wall 73 confines an opening 74 for access to the operating side 30 of the control key 3'. The base side 32 of the control key 3' is formed with a central recess 38. A spiral coil spring 39 is in the form of a series of concentric turns of increasing diameter. The coil spring 39 has a wider end that extends into the central recess 38 and that bears against the control key 3'. Unlike the previous embodiments, the rivet 4' is a solid body having a recessed top side 41. The coil spring 39 further has a narrow end that is seated on the recessed top side 41 of the rivet 4'. The operation of the third preferred embodiment is essentially the same as that of the previous embodiments and will not be detailed further.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A position control device comprising:
    a base board having one side provided with a conductive contact set that includes a plurality of angularly spaced conductive contacts;
    a conductive spring contact unit secured to said one side of said base board and including a plurality of angularly spaced spring contact arms that extend in radial directions and in a direction away from said base board such that each of said spring contact arms overlies spacedly a corresponding one of said conductive contacts of said conductive contact set; and
    a control key disposed on said conductive spring contact unit such that application of a force on said control key in a direction toward said base board will result in movement of an appropriate one of said spring contact arms for establishing electrical connection with the corresponding one of said conductive contacts.

2. The position control device as claimed in claim 1, wherein said spring contact arms have distal ends that bear against said control key.

3. The position control device as claimed in claim 2, wherein said control key has a base side, and said spring contact arms bear against said base side of said control key solely at said distal ends.

4. The position control device as claimed in claim 3, wherein said control key further has a peripheral portion formed with a stop flange that extends toward said base board, said distal ends of said spring contact arms forming clearances with said stop flange in the radial directions.

5. The position control device as claimed in claim 3, wherein said spring contact arms curve in the direction away from said base board and cooperate to form a bowl-shaped configuration.

6. The position control device as claimed in claim 3, wherein said base side of said control key has a conic shape such that a cross-section of said control key decreases gradually in the direction toward said base board.

7. The position control device as claimed in claim 1, wherein said conductive spring contact unit has a central portion interconnecting said spring contact arms such that each of said spring contact arms radiate from said central portion, said central portion being secured to said one side of said base board centrally of said conductive contact set.

8. The position control device as claimed in claim 7, wherein said central portion of said conductive spring contact unit and said base board are formed with aligned through holes.

9. The position control device as claimed in claim 8, further comprising a rivet mounted in said aligned through holes of said conductive spring contact unit and said base board to secure said conductive spring contact unit on said base board.

10. The position control device as claimed in claim 9, wherein said rivet is formed with a through hole coaxial with said aligned through holes of said conductive spring contact unit and said base board, said control key having a base side formed with a mounting post that extends through said through hole in said rivet and that is pivotable relative to said base board.

11. The position control device as claimed in claim 10, further comprising a retainer for engaging one end of said mounting post that extends through said rivet for retaining pivotally said control key on said base board.

12. The position control device as claimed in claim 11, wherein said retainer is hemispherical in shape and has a convex surface that abuts against said rivet and that projects into said through hole in said rivet.

13. The position control device as claimed in claim 8, further comprising a conductive ring member mounted in said through hole of said base board and in electrical contact with said central portion of said conductive spring contact unit.

14. The position control device as claimed in claim 1, further comprising a biasing member for biasing said control key away from said base board.

15. The position control device as claimed in claim 1, wherein said control key has an operating side provided with an operating stick.

16. The position control device as claimed in claim 1, wherein each of said spring contact arms is formed with a contact projection for contacting the corresponding one of said conductive contacts.

17. The position control device as claimed in claim 1, further comprising a hollow positioning cover mounted on said base board and surrounding said conductive contact set, said positioning cover restricting movement of said control key in the direction away from said base board.

18. The position control device as claimed in claim 17, wherein said positioning cover includes:

an annular first flange mounted on said one side of said base board and surrounding said conductive contact set;

an outer peripheral wall extending from said first flange in the direction away from said base board and beyond an operating side of said control key;

an annular second flange extending radially and inwardly from a distal end of said outer peripheral wall and overlapping a peripheral portion of said control key; and an inner peripheral wall extending from said second flange in the direction toward said base board for restricting the movement of said control key in the direction away from said base board, said inner peripheral wall confining an opening for access to said operating side of said control key externally of said positioning cover.

19. The position control device as claimed in claim 18, further comprising a biasing member for biasing said control key away from said base board.

* * * * *